Feb. 2, 1960

D. G. FAWKES 2,923,524

BUTTERFLY VALVE SEAT

Filed Oct. 24, 1956

2 Sheets-Sheet 1

Inventor:
Donald G. Fawkes
By: Schroeder, Hofgren,
Brady & Wegner
Attorneys

Feb. 2, 1960
D. G. FAWKES
2,923,524
BUTTERFLY VALVE SEAT
Filed Oct. 24, 1956
2 Sheets-Sheet 2
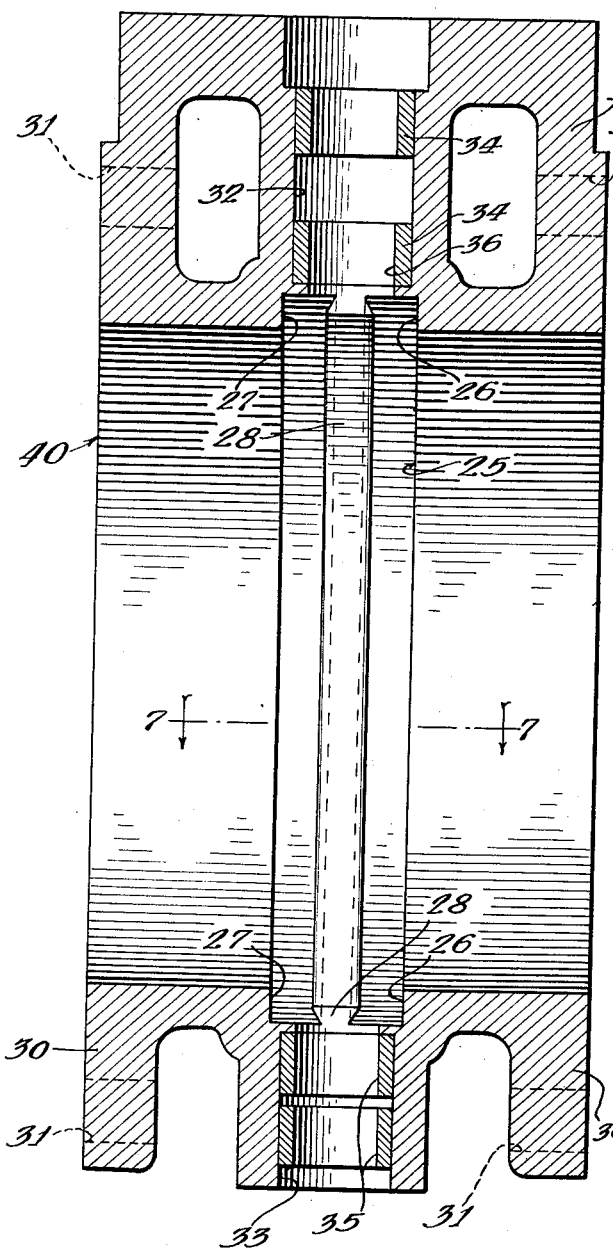
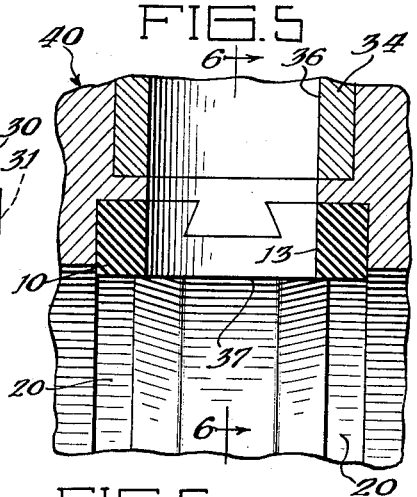
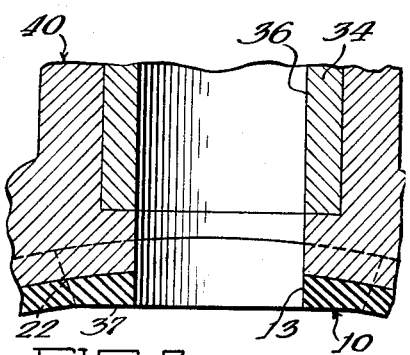
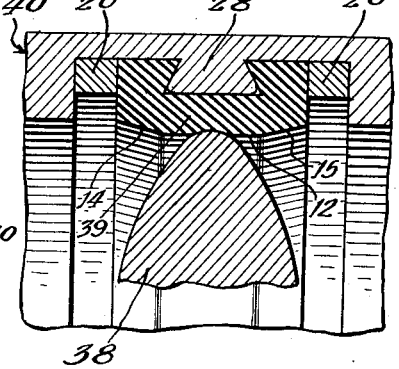
Inventor:
Donald G. Fawkes
By: Schroeder, Hofgren,
Brady & Wegner
Attorneys

United States Patent Office 2,923,524
Patented Feb. 2, 1960

2,923,524
BUTTERFLY VALVE SEAT

Donald G. Fawkes, Chicago, Ill., assignor to Henry Pratt Company, a corporation of Illinois Application October 24, 1956, Serial No. 618,004

9 Claims. (Cl. 251—306)

This invention relates to a valve of the type adapted to open and close in the manner of a butterfly valve and more particularly to a seat liner for such a valve.

Butterfly valves and valves having similar motion often close a gate body or disc against a rubber or rubber-like seat liner carried in the valve housing. Such liners are usually cemented and clamped into the valve housing to retain them in place. This invention has to do with a new seat liner having many advantages over those heretofore used. The principal object of this invention is to provide a new and improved resilient valve seat for valves.

Another object is to provide a resilient valve seat which may be easily replaced because of a simplified manner of securing the seat in a valve housing.

Another object is to provide a valve seat liner with a particular structure enabling a seal under pressure between the valve disc and the valve housing to prevent leakage past the seat.

Another object is to provide a valve liner of a new and improved structure requiring no reinforcing.

A further object is to provide a new valve seat structure which may be used in relatively small to very large valves operating from vacuum to superatmospheric pressures thus permitting standardization of the valve seat structure throughout an extensive line of valves.

Figures 1, 3:
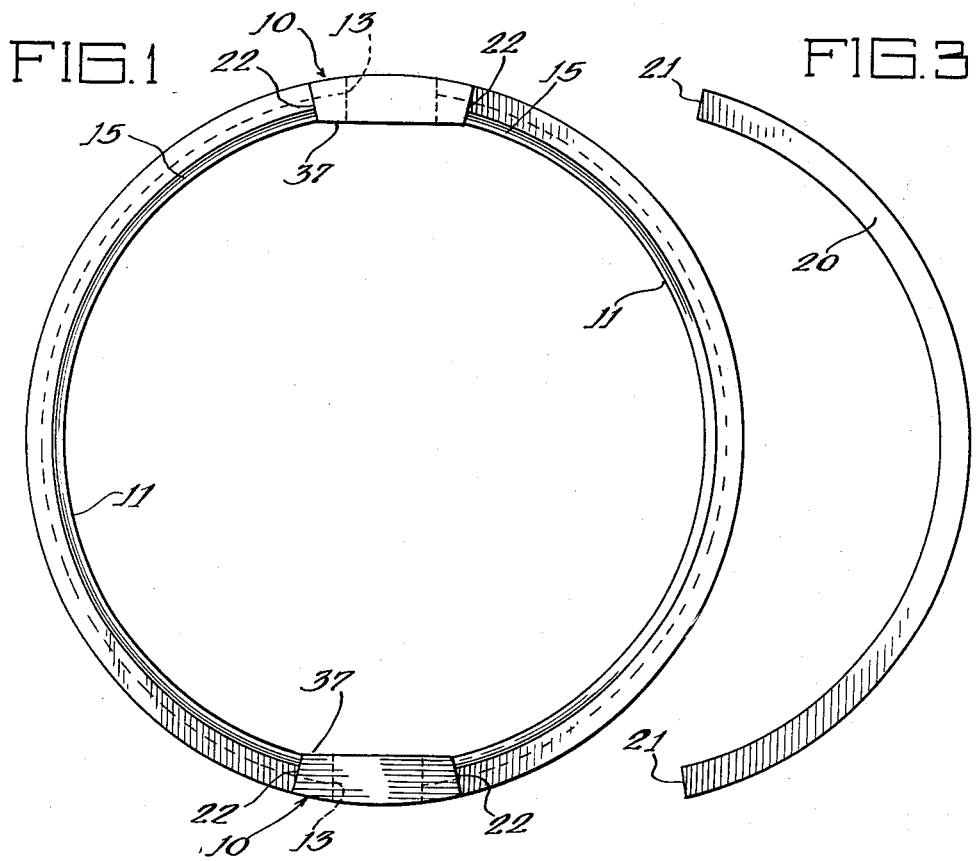
Figure 2:
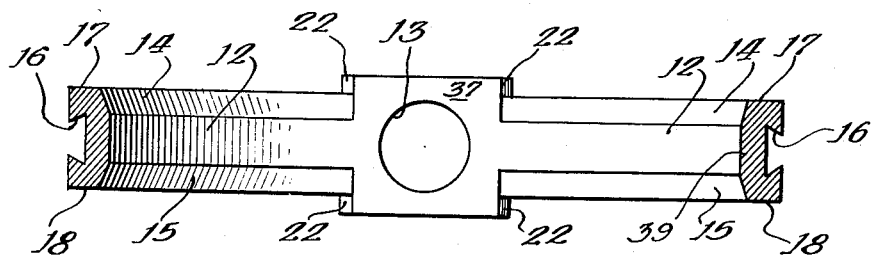

Further objectives, features and advantages of the present invention will be apparent from the following description of a preferred embodiment illustrated in the accompanying drawings, in which:

Figure 1 is a side plan view of the valve liner of this invention,

Figure 2 is a sectional view taken substantially through the center of symmetry of the liner shown in Figure 1, Figure 3 is a side elevational view of one of the retainers used to hold the seat in place in a valve casing, Figure 4 is a fragmentary sectional view through an exemplary valve housing or casing adapted to receive the liner of Figures 1 and 2, Figure 5 is an enlarged fragmentary sectional view through a portion of the housing taken at the valve shaft opening, Figure 6 is a view similar to Figure 5 taken substantially along line 6—6 in Figure 5, and Figure 7 is a fragmentary sectional view taken substantially along line 7—7 in Figure 4, showing a valve disc in position against the seat liner.

The embodiment of the present invention is illustrated as employed in a butterfly valve having a bolt flange for connection to a flanged pipe. The liner itself is formed of rubber material so that a valve disc mounted upon a shaft may be turned to rest against the medial portion of the liner. The liner structure is applicable to many types and sizes of butterfly valves and the principles involved may be used in several types of valves wherein a closure body may be shifted into and out of contact with a valve seat liner.

The liner is best illustrated in Figures 1 and 2. It is ordinarily preferred to form the liner in a molding operation so that it is an integral piece of rubber having laterally enlarged hub sections 10 joined by arcuate portions 11, of generally uniform cross-section between the hub sections. In Figure 2, it will be noted that the ring of the liner has an inner surface 12 continuous around the liner except for the diametrically opposite openings 13 made for the purpose of receiving the valve shaft. The valve disc would ordinarily seat against the inner exposed surface 12. Immediately adjoining the surface 12 is a slightly outwardly sloping surface 14 on one side and 15 on the other side. These surfaces provide a means for guiding the disc of the valve onto the surface 12.

The outer side of the liner is generally U-shaped in section and may be formed with a central groove 16, dove-tailed in section. This groove could be square as well as dove-tailed although the latter is preferred. Ordinarily, the outer edges 17 and 18 are upright surfaces parallel to each other for the purpose of fitting tightly within the valve casing against retainer members formed as shown in Figure 3. Each retainer member 20 is an arcuate segment of metal, hard rubber or reinforced rubber adapted to lay beside the liner against either a surface 17 or surface 18 with its ends 21 tightly abutting a shoulder 22 formed on the laterally enlarged hub sections of the liner. In some instances, more than four retainers may be used, in which case some of the retainers will abut each other end to end.

Each valve casing or housing intended to receive the liner of Figures 1 and 2 may be formed with an annular internal groove or recess generally indicated 25 in Figure 4. The groove is machined into the housing so as to have outer surfaces 26 and 27 generally normal to a center line through the valve housing. An upstanding rib 28 is formed medially of the groove 25 in order to extend into the medial groove 16 formed in the valve liner. Retainers 20 fill the space between the outer surfaces 26 and 27 of the housing groove and the side faces 17 and 18 of the valve liner and tightly abut the shoulders on the enlargements. Four retainers or more thus normally lock the liner in place in the valve housing. At the same time, the retainers may be physically pulled out of position in order to permit replacement of a worn liner.

The valve casing shown in Figure 4 has flanges 30 at either side equipped with bolt holes 31, although other types of valve casings may be equally well-suited for use with the present invention. It should be noted that the valve casing illustrated has a length between its flanges 30 greatly in excess of the width of the liner receiving groove 25. The section of the casing illustrated generally as 40 in Figure 4 was taken through the shaft openings 32 and 33 wherein sleeve bearings 34 and 35 are press fitted in place to receive the valve shaft. As illustrated in Figures 5 and 6, the opening 13 in the liner matches up in alignment with the opening 36 formed by the bearing 34.

One of the advantages of the present form of valve liner is its ability to seal against the valve disc to prevent leakage from one side to the other. It will be noted that each enlarged portion 10 of the liner has an inner flat surface 37 which may be sealed with pressure against the hub of the valve disc immediately around the valve shaft. In the placement of the disc in the valve housing, the rubber material of the liner will be slightly compressed to form a shaft seal around the shaft opening 13. The valve disc is fragmentarily shown at 38 in Figure 7 as compressing the thin central section 39 of the valve liner material. As the disc sweeps onto the surface 12, it compresses the rubber material of the liner so as to form a seal between itself and the liner material as well as to compress the material against the central rib 28 in the valve housing. In this manner a pressure seal is formed between the rubber liner and the metal parts on either side of the thin central section. Ordinarily, no leakage will occur past this seal.

A further advantage of the present liner structure is that it may be made quite narrow so that reinforcing in the rubber is not needed. One of the problems of employing rubber valve liners has been that fluid under pressure will get behind the liner and cause it to bulge inwardly around a closed valve disc. Under these circumstances, the disc may not be opened, thus causing a failure in valve operation. In the present structure any fluid under pressure that does find its way back of the valve liner must first pass the thin section of the seat where it is squeezed against the valve housing rib 28 forming a static seal against such fluid passage. Should any fluid get past the static seal so formed, such fluid will pass harmlessly to the low pressure side of the valve since there is no clamp or other structure holding the liner to the valve housing beyond the static seal. The seat material is pressed against the rib 28 but otherwise is held only frictionally in place. Thus, no metal, canvas or other reinforcement is required in the liner in order to avoid the problem previously encountered.

The present liner structure is independent in its form upon the form of the valve housing. The liner may be employed in valves from 4 inches in diameter up to 7 feet in diameter without materially changing the structure. In valves of the wafer type having no flanges in itself, the valve liner may be placed in such a position that it is not contacted by the adjoining pipe flanges and thus not subject to damage upon insertion or removal of the valve.

The present valve liner provides a simple solution to a problem of retaining rubber or rubberlike valve seats in valves of various kinds and sizes. It permits standardization throughout a line of valves which may range in operational requirements of vacuum to as high as 250 lbs. per square inch with the valve closed.

The foregoing detailed description has been given for clearness of understanding only, and no unnecessary limitations should be understood therefrom, for some modifications will be obvious to those skilled in the art.

I claim:

1. In a butterfly valve having a housing and a valve disc, a seat for the disc comprising: a one-piece annular ring of resilient material having a pair of diametrically opposite laterally enlarged and centrally apertured portions and an otherwise generally uniform section, said housing having a disc supporting shaft for projection through the apertured portions and an annular groove at least equal in width to said enlarged portions for receiving the annular seat, said groove being formed within the valve casing and being of lesser width than the width of the casing, and arcuate retainer members frictionally engaging the casing and the annular ring while abutting opposite enlarged portions endwise to retain the seat in the valve housing groove.

2. In a butterfly valve structure including a housing and a disc, a seat structure, comprising: a resilient seat ring having a generally uniform cross-section extending between diametrically opposite laterally enlarged shaft receiving portions, and an inner exposed surface to seal against the disc in closed position, said housing having a recessed annular groove entirely within the valve casing and generally equal in width to that of said seat ring enlarged portions for receiving the seat ring; seat ring retainers frictionally binding the ring in the housing groove, said retainers being removably inserted in the groove beside the ring and extending between and abutting said enlarged portions endwise to secure the ring in place.

3. A seat structure for a valve as specified in claim 2 wherein the seat ring has a relatively thin central section extending circumferentially and the housing groove is shaped to receive the seat ring in intimate contact therewith.

4. A seat structure for a valve as specified in claim 2 wherein the housing has an inwardly projecting tongue centrally of said recessed groove and the seat ring is shaped to embrace the tongue with said retainers frictionally holding each circumferential side of the seat ring against the tongue.

5. A seat structure for a valve as specified in claim 4 wherein the tongue is dove-tailed in sectional shape.

6. A seat structure for a valve including a housing and a rotatable closure on a shaft, comprising: a resilient annular ring having an inner surface to be contacted by the closure for sealing and opposite enlarged portions apertured to receive the shaft, said housing having an internal annular groove of uniform cross-section receiving the ring with the enlarged portions snug in the groove, and retainer segments bearing endwise against the enlarged portions and laterally against the housing and ring to retain the ring in place in the housing groove with the valve closure upon the shaft bearing outwardly against the ring enlarged portions about the shaft.

7. A valve seat for a butterfly valve having a casing carrying a valve disc, comprising: an annulus of resilient material extending around the interior of the casing, said annulus having an inner exposed surface to seal against the valve disc in closed position and an outer surface including a medial groove providing the annulus with a relatively thin section opposite the disc in closed position, said casing having a recess therein to receive said annulus and having a rib in the recess extending into said medial groove permitting said relatively thin section of resilient material centrally of the annulus to be compressed between the casing and disc in closed position; and arcuate keeper members extending along each side of the annulus, said annulus and keeper members extending in tandem across the entire width of said recess and frictionally retaining the annulus in the casing during opening and closing of the valve.

8. A valve seat as specified in claim 7 wherein the groove in the annulus is dove-tailed in cross-section and said rib is formed of corresponding shape filling said groove, so that the disc may compress the annulus material against the rib in closed position.

9. A valve seat for a butterfly valve having a casing carrying a valve disc, comprising: an annulus of resilient material extending around the interior of the casing, said annulus having an inner exposed surface to seal against the valve disc in closed position and a generally U-shaped cross-section providing a relatively thin medial portion to be compressed between the casing and disc, laterally enlarged portions integral with the annulus at diametrical positions thereon for receiving a valve disc supporting shaft therethrough and sealing about said shaft supports for the disc, said casing having an annular groove therein of a width to receive the enlarged portions, said casing groove receiving said annulus and having a medial rib extending into the U-shaped section, said enlargements being frictionally secured in the casing groove and keeper members extending between the enlargements beside the annulus frictionally engaging the annulus on one side and the valve casing on the opposite side to frictionally bind the annulus in place in the casing groove.

References Cited in the file of this patent

UNITED STATES PATENTS

| 1,977,351 | Phillips | Oct. 16, 1934 |
| 2,740,423 | Stillwagon | Apr. 3, 1956 |
| 2,791,238 | Bryant | May 7, 1957 |

FOREIGN PATENTS

| 670,327 | Germany | of 1939 |